(12) United States Patent
Deshpande et al.

(10) Patent No.: US 12,510,278 B2
(45) Date of Patent: Dec. 30, 2025

(54) SYSTEM AND METHOD FOR CONTROLLING AN OPERATION OF A VAPOR COMPRESSION CYCLE BASED ON A HYBRID MODEL OF DYNAMICS OF THE VAPOR COMPRESSION CYCLE

(71) Applicants: Vedang Deshpande, Cambridge, MA (US); Raphael Chinchilla, Cambridge, MA (US); Ankush Chakrabarty, Cambridge, MA (US); Christopher Laughman, Cambridge, MA (US)

(72) Inventors: Vedang Deshpande, Cambridge, MA (US); Raphael Chinchilla, Cambridge, MA (US); Ankush Chakrabarty, Cambridge, MA (US); Christopher Laughman, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 339 days.

(21) Appl. No.: 18/295,142

(22) Filed: Apr. 3, 2023

(65) Prior Publication Data
US 2024/0328695 A1    Oct. 3, 2024

(51) Int. Cl.
*F25B 49/02*    (2006.01)
*F24F 11/56*    (2018.01)
*F24F 11/64*    (2018.01)

(52) U.S. Cl.
CPC ............ *F25B 49/022* (2013.01); *F24F 11/56* (2018.01); *F24F 11/64* (2018.01); *F25B 2500/18* (2013.01);
(Continued)

(58) Field of Classification Search
CPC ...... F25B 49/00; F25B 49/02; F25B 2500/05; F25B 2500/19; F24F 11/30; F24F 11/56;
(Continued)

(56) References Cited

U.S. PATENT DOCUMENTS 10,605,507 B1    3/2020    Zugibe et al.
2018/0245809 A1*   8/2018   Endel ....................... F24F 11/30
(Continued)

FOREIGN PATENT DOCUMENTS

EP    2024694 B1    8/2011

OTHER PUBLICATIONS

Yuan Yin et al., "Augmenting physical models with deep networks for complex dynamics forecasting", Journal of Statistical Mechanics: Theory and Experiment, vol. 2021, Dec. 2021.

*Primary Examiner* — Jerry-Daryl Fletcher
*Assistant Examiner* — Daniel C Comings
(74) *Attorney, Agent, or Firm* — Gene Vinokur

(57) ABSTRACT

The present disclosure discloses a system and a method for controlling an operation of a vapor compression cycle based on a hybrid model of dynamics of the vapor compression cycle including a physics-based model and a data-driven model. The method comprises executing a constrained Kalman smoother over the observed variables collected over multiple instances of time to jointly estimate the parameters of the physics-based model and states of the vapor compression cycle, and updating the data-driven model to minimize a difference between the states estimated by executing the constrained Kalman smoother and the states predicted by the physics-based model. The method further comprises updating the hybrid model with the estimated parameters of the physics-based model and the updated data-driven model, and controlling the operation of the vapor compression cycle using the updated hybrid model.

20 Claims, 10 Drawing Sheets

(52) U.S. Cl.
CPC ....... *F25B 2500/19* (2013.01); *F25B 2600/11* (2013.01); *F25B 2600/2513* (2013.01); *F25B 2700/171* (2013.01); *F25B 2700/19* (2013.01); *F25B 2700/21* (2013.01)

(58) Field of Classification Search
CPC .. F24F 11/58; F24F 11/62; F24F 11/63; F24F 11/64; G05B 13/027; G05B 13/04; G05B 13/041; G05B 13/042
See application file for complete search history.

(56) References Cited

U.S. PATENT DOCUMENTS

2020/0224915 A1\* 7/2020 Nourbakhsh ............ F24F 11/54
2022/0268479 A1 8/2022 Jang et al.

\* cited by examiner

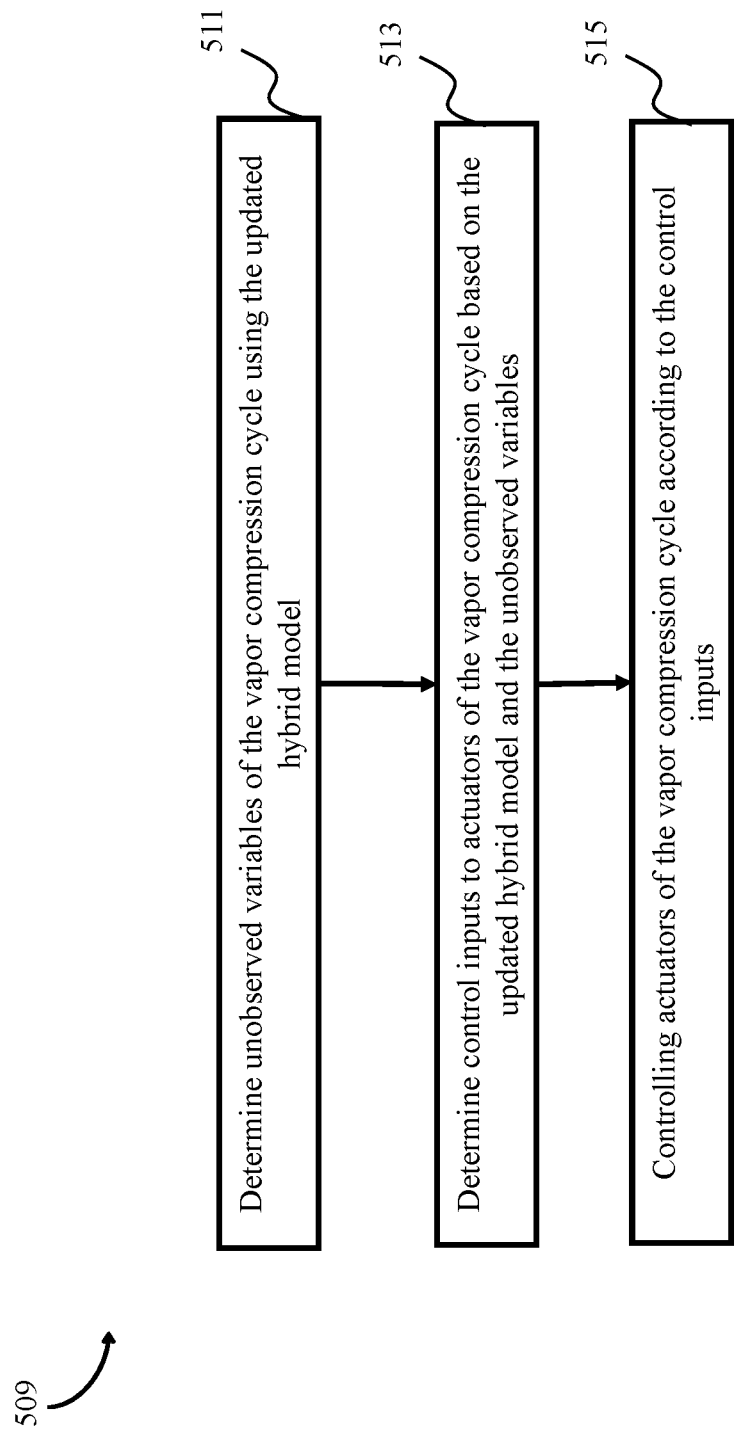

SYSTEM AND METHOD FOR CONTROLLING AN OPERATION OF A VAPOR COMPRESSION CYCLE BASED ON A HYBRID MODEL OF DYNAMICS OF THE VAPOR COMPRESSION CYCLE

TECHNICAL FIELD

The present disclosure relates to vapor compression cycles and more particularly to a system and a method for controlling an operation of a vapor compression cycle.

BACKGROUND

Vapor compression cycles represent a fundamental technology in contemporary society because of their wide use in air-conditioning and space heating applications. Role of the vapor compression cycles is expected to grow in future years as the vapor compression cycles provide an effective means for decarbonizing heating systems and utilizing electrical energy generated by renewable sources, such as photovoltaic or wind power. There is thus widespread interest in further developing vapor compression cycle technology so that they are both energy efficient and satisfy performance requirements related to user health and comfort in buildings.

A range of control technologies employed in the vapor compression cycles use a model that represents underlying physics/dynamics of the vapor compression cycle, for predicting behavior of the vapor compression cycle and controlling the vapor compression cycle. Accurate predictions of the behavior of vapor compression cycle can be used in control technologies, e.g., model predictive control and estimation of performance parameters such as cooling capacity delivered by the heat exchangers (HEXs). The model of the vapor compression cycle may also play an important role in development of fault detection and diagnosis algorithms, and are central to emerging digital twin technologies aiming to improve energy efficiency, streamline maintenance, and maximize user comfort.

Some approaches use a physics-based model for predicting the behavior of the vapor compression cycle. The physics-based model is derived from first principles of physics resulting in a high-dimensional set of nonlinear differential algebraic equations for a multiphysical system such as vapor-compression cycle. Such a model is generally formulated to satisfy application-specific physics-based or computational requirements and relate to physical processes most relevant to the application. Simplifying assumptions that accompany such requirements, e.g., lumped parameters and finite discretization, often lead to a mismatch between the model predictions and data collected from the system. Addressing the mismatch to improve accuracy of the model predictions is a non-trivial task that may require unjustifiable effort and complexity resulting in comparatively smaller prediction improvements.

Alternatively, a data-driven model may be used for predicting the behavior of the vapor compression cycle. The data-driven model is developed using data collected from the system. However, the data-driven model need large datasets including full-state trajectories to achieve reasonable modeling accuracy. Such large datasets are unavailable due to limited sensor data. Further, the data-driven model suffers from a combination of other challenges, such as non-interpretability of the data-driven model, large parameter search spaces, and do not explicitly account for fundamental physical laws that govern the system.

Accordingly, there is a still a need for a model of the dynamics of the vapor compression cycle for controlling the vapor compression cycle.

SUMMARY

It is an object of some embodiments to provide a system and a method for controlling an operation of a vapor compression cycle using a hybrid model of dynamics of the vapor compression cycle. The hybrid model of the dynamics of the vapor compression cycle includes a physics-based model and a data-driven model. It is also an object of some embodiments to determine model attributes of the hybrid model.

Some embodiments are based on the realization that modeling efforts for the vapor compression cycle may benefit from a hybrid modeling paradigm which combines domain expertise represented by the physics-based model with the data-driven model to learn the behavior of the vapor compression cycle. Accordingly, the present disclosure provides the hybrid model of the dynamics of the vapor compression cycle that includes the physics-based model and the data-driven model. The physics-based model is configured to predict transitions of states of the vapor compression cycle in accordance with observed variables and a control input to the vapor compression cycle based on parameters of the physics-based model. The physics-based model includes one or a combination of governing partial differential equations discretized over spatial and temporal domains, look up tables, and interpolation splines for calculating thermodynamic properties of the refrigerant of the vapor compression cycle. The data-driven model is trained with machine learning to estimate residual errors of the state transitions predicted by the physics-based model. The data-driven model may include a neural network.

The physics-based model parameterized by parameter vector $\theta$, which includes a number of finite control volumes for discretization of governing partial differential equations, geometric parameters of the vapor compression cycle, properties of materials used in the vapor compression cycle, a total mass of the refrigerant and the like. On the other hand, the data-driven model, e.g. a neural network, is parameterized by a vector $w$, which includes weights and biases of each artificial neuron as well as parameters that define an architecture of the neural network.

It is an object of some embodiments to estimate model attributes of the hybrid model, based on observed variables collected over multiple instances of time. The model attributes of the hybrid model include parameters of the physics-based model, i.e, parameters $\theta$, and parameters of the data-driven model, i.e, parameters $w$. The observed variables include temperatures and pressures measured by sensors installed at different locations in the vapor compression cycle. It is desired that the estimated model attributes are such that contribution of the physics-based model is maximized in the hybrid model while the data-driven model is utilized only to correct modeling errors that cannot be otherwise rectified with the physics-based model alone. Therefore, the data-driven model is utilized to learn residual dynamics based on mismatches of the physics-based model with respect to the observed variables. Accordingly, in an embodiment of the present disclosure, the parameters of the physics-based model and the data-driven model are determined by solving a joint optimization problem that minimizes a cost function comprising penalties on deviations between predicted and real outputs of the vapor compression cycle, and weighted norm of the data-driven model outputs.

Some embodiments are based on the recognition that simultaneously estimating the parameters θ of the physics-based model and the parameters w of the data-driven model is a challenging problem because they are fundamentally different variables. On one hand, the parameters θ of the physics-based model, in general, has low dimension but derivative with respect to the parameters θ are hard to compute, as they require derivative of a solution of a differential equation. Moreover, the dynamics of the vapor-compression cycle are nonlinear, numerically stiff, and have derivative discontinuities due to phase changes that accompany evaporation or condensation. On the other hand, the parameters w have large dimension, but the derivatives can be efficiently computed using standard computing tools such as automatic differentiation.

Some embodiments of the present disclosure are based on a realization that the computational challenges associated with the joint optimization problem can be addressed by decomposing the joint optimization problem into two equivalent tractable unconstrained optimization problems that determine θ and w separately instead of solving the joint optimization problem. For instance, the joint optimization problem can be decomposed into a first optimization problem of joint estimation of the states of the vapor compression cycle and the parameters θ of the physics-based model, and a second optimization problem of determining the parameters w of the data-driven model.

Some embodiments are based on the realization that the first optimization problem can be interpreted as a joint state and parameter estimation problem based on the physics-based model of the vapor compression cycle. Such an interpretation allows utilization of optimal smoothing formulation to determine a solution. In particular, an approximate solution to the first optimization problem can be determined efficiently using wide range of nonlinear estimation methods. However, in general, estimation methods do not guarantee that physics-based constraints, such as monotonicity of pressures in refrigerant flow-direction in the vapor compression cycle, will be satisfied. It is important that such physics-based constraints are satisfied to ensure that state estimates are physically realizable. Accordingly, one embodiment uses a constrained Kalman smoother, such as a Constrained Extended Kalman Smoother (C-EKS) or Constrained Ensemble Kalman Smoother (C-EnKS), that is tailored for estimation of the vapor compression cycle and enforces the physics-based constraints during joint estimation of the states of the vapor compression cycle and the parameters of the physics-based model.

Therefore, the first optimization problem is solved using the constrained Kalman smoother to estimate the parameters of the physics-based model and the states of the vapor compression cycle. In particular, the constrained Kalman smoother is executed over the observed variables collected over multiple time instances to estimate the parameters of the physics-based model and the states of the vapor compression cycle.

There exists a difference between the states predicted by the physics based model and the states estimated by executing the constrained Kalman smoother. Such a difference is referred to as a residual error. To compensate for the residual error, the parameters w of the data-driven model are determined such that a cumulative learning cost function, which is comprised of a difference between the residual errors and the data-driven model outputs corresponding to the same inputs that generated the error residuals at that time instants, is minimized. The residual errors are known constants within the scope of the second optimization problem, thus, the data-driven model essentially attempts to learn the residual errors for a given input state vector and control input vector.

To that end, some embodiments of the present disclosure are based on the realization that the second optimization problem of determining the parameters of the data-driven model is a standard neural network training problem. According to an embodiment, the second optimization problem is solved using stochastic gradient descent to determine the parameters of the data-driven model.

Further, the hybrid model is updated with the parameters of physics-based model estimated by executing the constrained Kalman smoother, and the parameters of the data-driven model determined by solving the second optimization problem using the stochastic gradient descent. In other words, the updated hybrid model includes the physics-based model with the parameters estimated by executing the constrained Kalman smoother and the data-driven model with the parameters determined by solving the second optimization problem using the stochastic gradient descent. Further, the operation of the vapor compression cycle is controlled using the updated hybrid model. For instance, based on the updated hybrid model, control inputs to actuators of the vapor compression cycle are determined. The control inputs, for example, include e.g., a speed of a compressor, a speed of a fan, and a position of an expansion valve. The operation of the vapor compression cycle is controlled according to the control inputs.

Accordingly, one embodiment discloses a controller for controlling an operation of a vapor compression cycle based on a hybrid model of dynamics of the vapor compression cycle including a physics-based model and a data-driven model, wherein the physics-based model is configured to predict transitions of states of the vapor compression cycle in accordance with observed variables and a control input to the vapor compression cycle based on parameters of the physics-based model, and wherein the data-driven model is trained with machine learning to estimate residual errors of the state transitions predicted by the physics-based model, the controller comprising: a processor; and a memory having instructions stored thereon that, when executed by the processor, cause the controller to: collect a digital representation of observed variables of the operation of the vapor compression cycle over multiple instances of time; execute a constrained Kalman smoother over the observed variables collected over multiple instances of time to jointly estimate the parameters of the physics-based model and states of the vapor compression cycle to minimize a cost function comprised of residual errors of the state transitions predicted by the physics-based model for the multiple instances of time, and residual errors between observed variables estimated by the constrained Kalman smoother for the multiple instances of time and the corresponding collected observed variables; update the data-driven model to minimize a difference between the states estimated by executing the constrained Kalman smoother over the observed variables collected over multiple instances of time and the states predicted by the physics-based model; update the hybrid model with the estimated parameters of the physics-based model and the updated data-driven model; and control the operation of the vapor compression cycle using the updated hybrid model.

Accordingly, another embodiment discloses a method for controlling an operation of a vapor compression cycle based on a hybrid model of dynamics of the vapor compression cycle including a physics-based model and a data-driven model, wherein the physics-based model is configured to predict transitions of states of the vapor compression cycle in accordance with observed variables and a control input to the vapor compression cycle based on parameters of the physics-based model, and wherein the data-driven model is trained with machine learning to estimate residual errors of the state transitions predicted by the physics-based model. The method comprises: collecting a digital representation of observed variables of the operation of the vapor compression cycle over multiple instances of time; executing a constrained Kalman smoother over the observed variables collected over multiple instances of time to jointly estimate the parameters of the physics-based model and states of the vapor compression cycle to minimize a cost function comprised of residual errors of the state transitions predicted by the physics-based model for the multiple instances of time, and residual errors between observed variables estimated by the constrained Kalman smoother for the multiple instances of time and the corresponding collected observed variables; updating the data-driven model to minimize a difference between the states estimated by executing the constrained Kalman smoother over the observed variables collected over multiple instances of time and the states predicted by the physics-based model; updating the hybrid model with the estimated parameters of the physics-based model and the updated data-driven model; and controlling the operation of the vapor compression cycle using the updated hybrid model.

Accordingly, yet another embodiment discloses a non-transitory computer readable storage medium embodied thereon a program executable by a processor for performing a method for controlling an operation of a vapor compression cycle based on a hybrid model of dynamics of the vapor compression cycle including a physics-based model and a data-driven model, wherein the physics-based model is configured to predict transitions of states of the vapor compression cycle in accordance with observed variables and a control input to the vapor compression cycle based on parameters of the physics-based model, and wherein the data-driven model is trained with machine learning to estimate residual errors of the state transitions predicted by the physics-based model. The method comprises: collecting a digital representation of observed variables of the operation of the vapor compression cycle over multiple instances of time; executing a constrained Kalman smoother over the observed variables collected over multiple instances of time to jointly estimate the parameters of the physics-based model and states of the vapor compression cycle to minimize a cost function comprised of residual errors of the state transitions predicted by the physics-based model for the multiple instances of time, and residual errors between observed variables estimated by the constrained Kalman smoother for the multiple instances of time and the corresponding collected observed variables; updating the data-driven model to minimize a difference between the states estimated by executing the constrained Kalman smoother over the observed variables collected over multiple instances of time and the states predicted by the physics-based model; updating the hybrid model with the estimated parameters of the physics-based model and the updated data-driven model; and controlling the operation of the vapor compression cycle using the updated hybrid model.

BRIEF DESCRIPTION OF THE DRAWINGS

FIG. 5B shows a block diagram for controlling the operation of the vapor compression cycle using an updated hybrid model, according to an embodiment of the present disclosure.

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
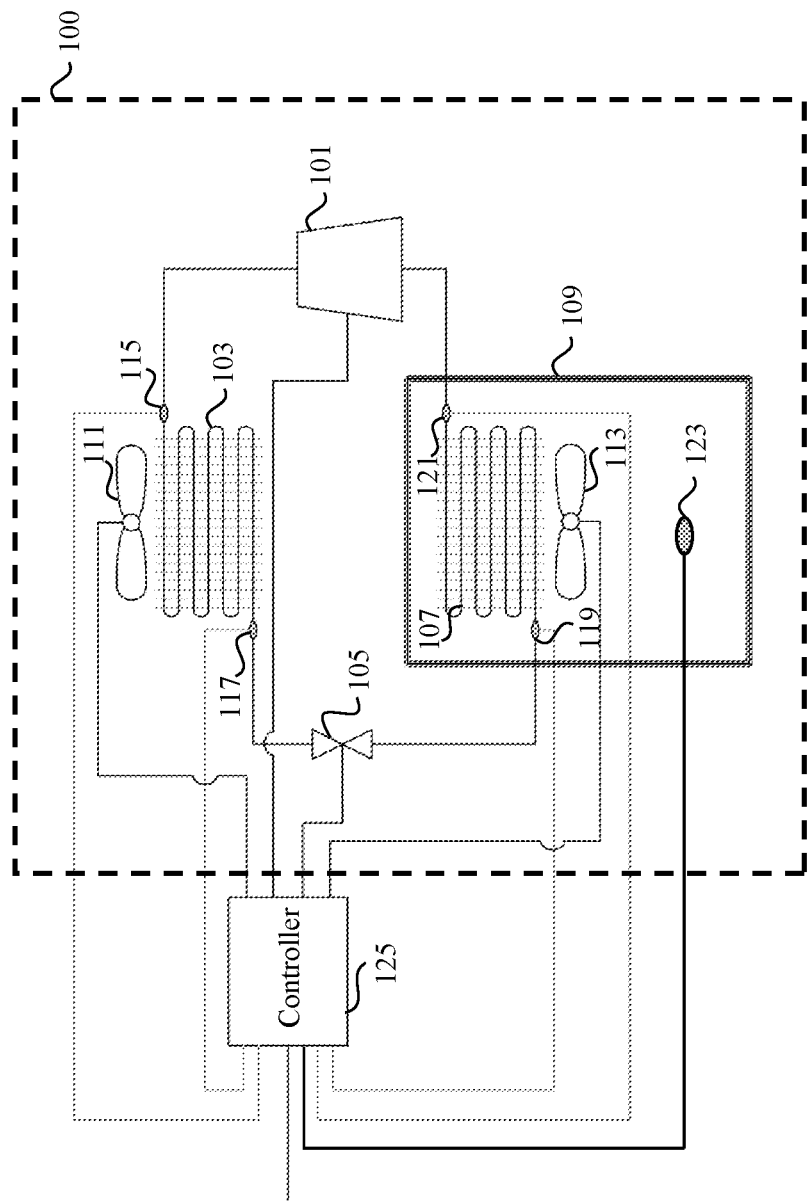
FIG. 1A illustrates a vapor compression cycle, according to an embodiment of the present disclosure.

FIG. 1A illustrates a vapor compression cycle 100, according to an embodiment of the present disclosure. The vapor compression cycle 100 includes a compressor 101, a condensing heat exchanger 103, an expansion valve 105, and an evaporating heat exchanger 107 located in a space 109. Heat transfer from the condensing heat exchanger 103 is promoted by use of a fan 111, while heat transfer from the evaporating heat exchanger 107 is promoted by use of a fan 113. The vapor compression cycle 100 may include variable actuators, such as a variable compressor speed, a variable expansion valve position, and variable fan speeds. There are many other alternate equipment architectures to which the present disclosure pertains with multiple heat exchangers, compressors, valves, and other components such as accumulators or reservoirs, pipes, and so forth, and the illustration of the vapor compression cycle 100 is not intended to limit the scope or application of the present disclosure to systems whatsoever.

In the vapor compression cycle 100, the compressor 101 compresses a low pressure, low temperature vapor-phase fluid (a refrigerant) to a high pressure, high temperature vapor state, after which it passes into the condensing heat exchanger 103. As the refrigerant passes through the condensing heat exchanger 103, the heat transfer promoted by the fan 111 causes the high-temperature, high pressure refrigerant to transfer its heat to ambient air, which is at a lower temperature. As the refrigerant transfers the heat to the ambient air, the refrigerant gradually condenses until the refrigerant is in a high pressure, low temperature liquid state. Further, the refrigerant leaves the condensing heat exchanger 103 and passes through the expansion valve 105, and expands to a low pressure boiling state from which it enters the evaporating heat exchanger 107. As air passing over the evaporating heat exchanger 107 is warmer than the refrigerant itself, the refrigerant gradually evaporates as it passes through the evaporating heat exchanger 107. The refrigerant leaving the evaporating heat exchanger 107 is at a low pressure, low temperature state. The low pressure, low temperature refrigerant re-enters the compressor 101 and the same cycle is repeated.

The vapor compression cycle 100 operates at a nominal set of input values for actuators, e.g., a speed of the compressor 101, a speed of the fan 111, a position of the expansion valve 105, a speed of the fan 113, and the like. It is desired or an objective that the vapor compression cycle 100 achieve performance metrics, for example, regulating variables such as a temperature or humidity in the space 109 or regulating process variables such as a temperature or a pressure at one or more points in the vapor compression cycle 100. To achieve such objectives, one or more sensors are installed at various locations in the vapor compression cycle 100 to monitor variables of interest. The variables of interest may include the temperature, the humidity, and/or the pressure. For example, sensors, such as a sensor 115, a sensor 117, a sensor 119, a sensor 123, and a sensor 121 (collectively referred to as sensors 115, 117, 119, 121, and 123), are located at different locations. The sensors 115, 117, 119, and 121 monitor the temperature and/or the pressure at their respective locations. Alternatively or in addition, measurements of variables in the space 109, such as temperature or humidity, may also be obtained via sensors such as a sensor 123.

Information from the sensors 115, 117, 119, 121, and 123 is input to a controller 125 associated with the vapor compression cycle 100. Based on the information from the sensors 115, 117, 119, 121, and 123, the controller 125 may control an operation of the vapor compression cycle 100. For example, based on the information from the sensors 115, 117, 119, 121, and 123, the controller 125 may change the input values of the actuators, e.g., the speed of the compressor 101, the speed of the fan 111, the position of the expansion valve 105, and the speed of the fan 113, to achieve desired performance metrics.

Figure 1B:
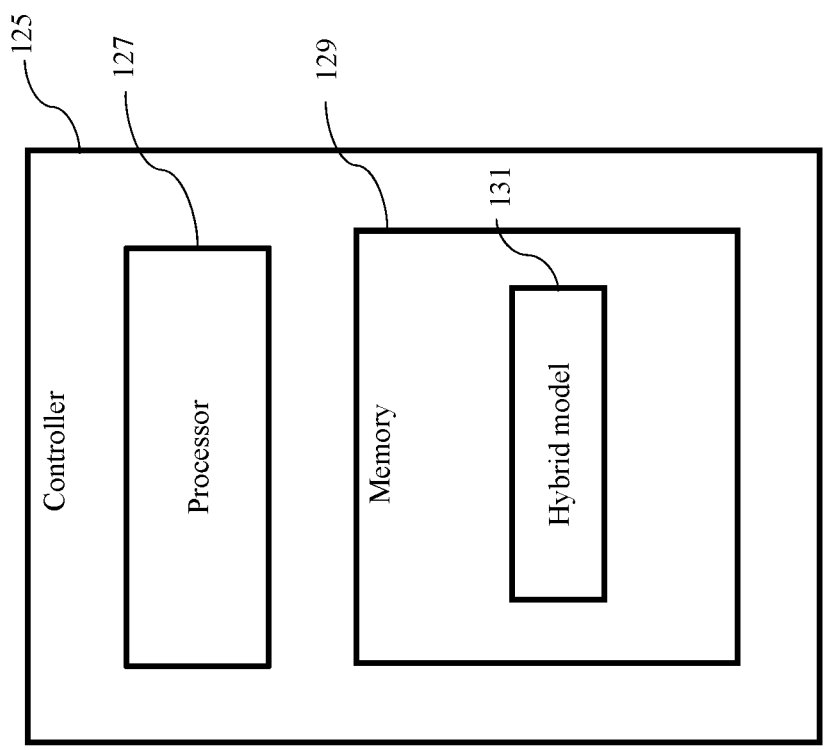
FIG. 1B shows a block diagram of a controller for controlling an operation of the vapor compression cycle, according to an embodiment of the present disclosure.

FIG. 1B shows a block diagram of the controller 125, according to an embodiment of the present disclosure. The controller 125 includes a processor 127 and a memory 129. The processor 127 may be a single core processor, a multi-core processor, a computing cluster, or any number of other configurations. The memory 129 may include random access memory (RAM), read only memory (ROM), flash memory, or any other suitable memory systems. Additionally, in some embodiments, the memory 129 may be implemented using a hard drive, an optical drive, a thumb drive, an array of drives, or any combinations thereof.

The processor 127 is configured to collect a digital representation of observed variables of an operation of the vapor compression cycle 100 over multiple instances of time. In an embodiment, the processor 127 collects the digital representation of observed variables of the operation of the vapor compression cycle 100 from the sensors 115, 117, 119, 121, and 123. The observed variables include, for example, measurements of one or more of the temperature and the pressure at different locations in the vapor compression cycle 100.

The controller 125 may employ a model that represents underlying physics/dynamics of the vapor compression cycle 100, for predicting behavior of the vapor compression cycle 100. Based on the collected digital representation of observed variables, the model predicts the behavior of the vapor compression cycle 100. Accurate predictions of the behavior of vapor compression cycle 100 can be used in a range of control technologies, e.g., model predictive control and estimation of performance parameters such as cooling capacity delivered by the heat exchangers (HEXs). The model of the vapor compression cycle 100 may also play an important role in development of fault detection and diagnosis algorithms, and are central to emerging digital twin technologies aiming to improve energy efficiency, streamline maintenance, and maximize user comfort.

The model of the vapor compression cycle 100 may be a physics-based model. The physics-based model is derived from first principles of physics resulting in a high-dimensional set of nonlinear differential algebraic equations for a metaphysical system such as vapor-compression cycle 100. Such a model is generally formulated to satisfy application-specific physics-based or computational requirements and relate to physical processes most relevant to the application. Simplifying assumptions that accompany such requirements, e.g., lumped parameters and finite discretization, often lead to a mismatch between the model predictions and data collected from the system (e.g., Vapor Compression System (VCS)). Addressing the mismatch to improve accuracy of the model predictions is a non-trivial task that may require unjustifiable effort and complexity, resulting in comparatively smaller prediction improvements.

Alternatively, the model of the vapor compression cycle 100 may be a data-driven model. The data-driven model is developed using the data collected from the system. However, the data-driven model need large datasets including full-state trajectories to achieve reasonable modeling accuracy. Such large datasets are unavailable due to limited sensor data. Further, the data-driven model suffers from a combination of other challenges, such as non-interpretability of the data-driven model, large parameter search spaces, and do not explicitly account for fundamental physical laws that govern the system.

Some embodiments are based on the realization that modeling efforts for the vapor compression cycle 100 may benefit from a hybrid modeling paradigm which combines domain expertise represented by the physics-based model with the data-driven model to learn the behavior of the vapor compression cycle 100. Accordingly, the present disclosure provides a hybrid model 131 of the dynamics of the vapor compression cycle 100. In an embodiment, the hybrid model 131 is stored in the memory 129. The hybrid model 131 is described below in FIG. 1C.

Figure 1C:
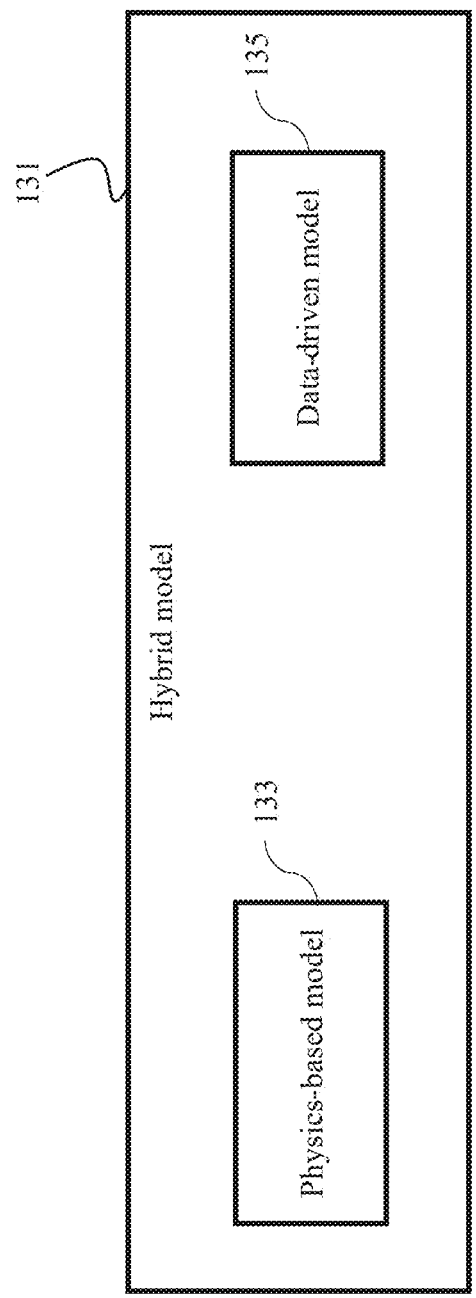
FIG. 1C illustrates a hybrid model of dynamics of the vapor compression cycle, according to some embodiments of the present disclosure.

FIG. 1C illustrates the hybrid model 131 of the dynamics of the vapor compression cycle 100, according to some embodiments of the present disclosure. The hybrid model 131 of the dynamics of the vapor compression cycle 100 includes a physics-based model 133 and a data-driven model 135. The physics-based model 133 is configured to predict transitions of states of the vapor compression cycle 100 in accordance with the observed variables and a control input to the vapor compression cycle 100 based on parameters of the physics-based model 133. The physics-based model 133 includes one or a combination of governing partial differential equations discretized over spatial and temporal domains, look up tables, and interpolation splines for calculating thermodynamic properties of the refrigerant of the vapor compression cycle 100. The data-driven model 135 is trained with machine learning to estimate residual errors of the state transitions predicted by the physics-based model 133. The data-driven model 135 may include a neural network.

Mathematically, the hybrid model 131 is given as $$x_{k+1} = F_p(x_k, u_k, \theta) + F_d(x_k, u_k, w) \quad (1)$$

where $x_k$ is a state vector of the vapor compression cycle 100 at time $t_k$ and $u_k$ is a vector of control inputs to the vapor compression cycle 100 at time $t_k$. The vector $u_k$ includes the control inputs commanded by the controller 125, such as the speed of the compressor 101, the speed of the fan 111, the position of the expansion valve 105, and the speed of the fan 113. Additionally, the vector $u_k$ may also include variables which affect the behavior of the vapor compression cycle 100, such as temperature and relative humidity in the space 109 and ambient outdoor environment. In equation (1), $F_p$ represents the physics-based model parameterized by parameter vector $\theta$, which includes a number of finite control volumes for discretization of governing partial differential equations, geometric parameters of the vapor compression cycle, properties of materials used in the vapor compression cycle 100, a total mass of the refrigerant and the like. On the other hand, $F_d$ denotes the data-driven model, e.g. a neural network, parameterized by a vector $w$, which includes weights and biases of each artificial neuron as well as parameters that define an architecture of the neural network.

It is an object of some embodiments to estimate model attributes of the hybrid model 131, based on the observed variables collected over multiple instances of time. The model attributes of the hybrid model 131 include parameters of the physics-based model 133, i.e. parameters $\theta$, and parameters of the data-driven model 135, i.e parameters $w$.

The observed variables can be represented by the following measurement equation $$y_k = h(x_k, u_k, \theta) + \eta \quad (2)$$

where $\eta$ is a normal variable $N(0, R)$. Measurement model $h(x_k, u_k, \theta)$ takes as inputs state vector $x_k$ and the control inputs vector $u_k$ to predict the observed variables $y_k$, and $\eta$ accounts for random disturbances, e.g. sensor noise, that corrupt the measurements. The observed variables $y_k$ include temperatures and pressures measured by the sensors 115, 117, 119, 121, and 123 installed at different locations in the vapor compression cycle 100.

The processor 127 is configured to estimate the model attributes of the hybrid model 131, i.e., the parameters $\theta$ and $w$, by solving the following joint optimization problem $$\min_{\theta, w, x_k} \sum_{k=1}^{K} \|F_d(x_k, u_k, w)\|^2_{P^{-1}} + \|y_k - h(x_k, u_k, \theta)\|^2_{R^{-1}} + \quad (3)$$

$$\|\overline{x_0} - x_0\|^2_{S^{-1}} \text{ s.t. } x_{k+1} = F_p(x_k, u_k, \theta) + F_d(x_k, u_k, w),$$

$$k = 0, \ldots, K-1$$

where the observed variables are collected and stored over multiple time instances k=1, 2, . . . ,K.

First term in the problem (3) directly penalizes contribution of the data-driven model Fa weighted by a positive definite matrix P, while enforcing equality constraints as defined by the hybrid model (1). The choice of the first term in cost function is based on the realization that naïve minimization of an obvious cost, e.g. $\|x_{k+1} - F_p(x_k, u_k, \theta) - F_d(x_k, u_k, w)\|\lambda$, can Lead to undesired solutions. For example, in an extreme case, a combination of optimal parameters $(\theta^*, w^*)$ may exist such that $F_p(x_k, u_k, \theta^*)=0$ and information of the dynamics of the vapor compression cycle 100 comes only from the data-driven model while discarding information from the physics-based model. Instead, it is desired that the physics-based model $F_p$ provides most of the explanation of the behavior of the vapor compression cycle 100 because the physics-based model $F_p$ tends to be more robust and generalizes better to new or unseen data. In the limiting case, if there exist parameters $\theta^*$ such that $x_{k+1} - F_p(x_k, u_k, \theta^*)=0$, then the formulation (3) determines such parameters and discard any contribution from the data-driven model.

Second term in the problem (3) penalizes deviations of the predicted measurements $h(x_k, u_k, \theta)$ from the observed variables $y_k$ weighted by a covariance matrix R of the sensor noise that corrupts the measurements. Finally, the last term in problem (3) accounts for initial state uncertainty as initial condition is generally not known and it is assumed to be normally distributed as $N(\overline{x_0}, S)$.

In data-driven modeling approaches such as the neural networks, it is common to determine optimal parameters $(\theta^*, w^*)$ by minimizing the cost function over multiple trajectories of the system for improved modeling accuracy and better generalizing properties. Therefore, the problem (3) can be reformulated as following joint optimization problem $$\min_{\theta, w, x_k^i} \sum_{i=1}^{N} \sum_{k=1}^{K} \|F_d(x_k^i, u_k^i, w)\|^2_{P^{-1}} + \|y_k^i - h(x_k^i, u_k^i, \theta)\|^2_{R^{-1}} + \quad (4)$$

$$\|\overline{x_0}^i - x_0^i\|^2_{S^{-1}} \text{ s.t. } x_{k+1}^i = F_p(x_k^i, u_k^i, \theta) + F_d(x_k^i, u_k^i, w),$$

$$k = 0, \ldots, K-1$$

where superscript i denotes $i^{th}$ trajectory in training data set including a total of N trajectories.

Numerical optimization to solve (4) is challenging because the equality constraints need to be relaxed or incorporated via Lagrangian methods and the parameters θ and w are fundamentally different optimization variables. On one hand, the parameters θ in general has low dimension but derivative with respect to e are hard to compute, as they require derivative of a solution of a differential equation. Moreover, the dynamics of the vapor-compression cycle 100 are nonlinear, numerically stiff, and have derivative discontinuities due to phase changes that accompany evaporation or condensation. On the other hand, w has large dimension, but the derivatives can be efficiently computed using standard computing tools such as automatic differentiation.

Some embodiments of the present disclosure are based on a realization that the computational challenges associated with the joint optimization (4) can be addressed by decomposing (4) into two equivalent tractable unconstrained optimization problems that determine θ and w separately instead of solving the joint optimization problem (4), as described below in FIG. 1D.

Figure 1D:
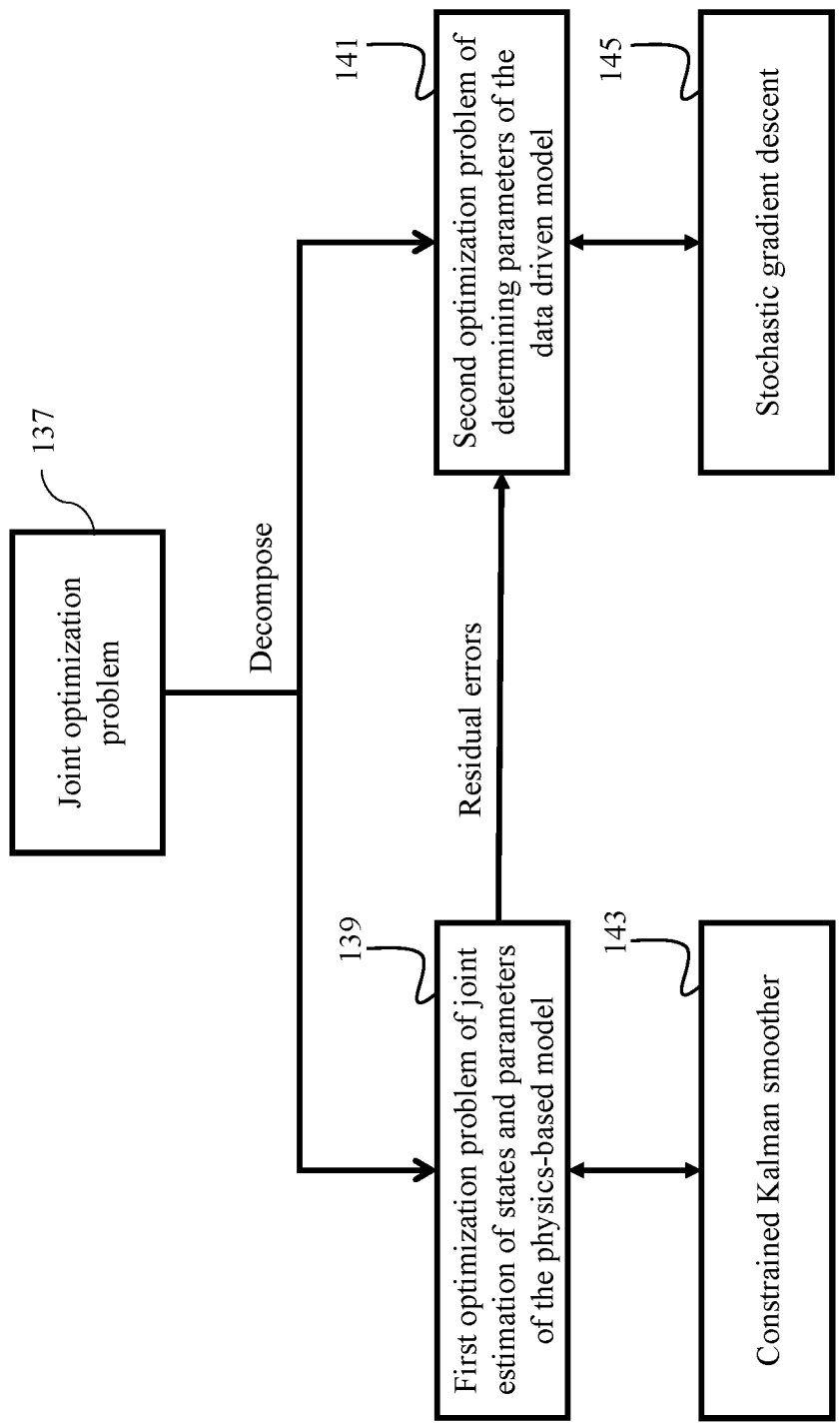
FIG. 1D shows a schematic illustrating decomposition of a joint optimization problem, according to some embodiments of the present disclosure.

FIG. 1D shows a schematic illustrating decomposition of the joint optimization problem (4), according to some embodiments of the present disclosure. The joint optimization problem (4) 137 is decomposed into a first optimization problem 139 of joint estimation of the states of the vapor compression cycle 100 and the parameters θ of the physics-based model 133, and a second optimization problem 141 of determining the parameters w of the data-driven model 135.

The first optimization problem 139 includes minimizing a cost function comprised of residual errors of the state transitions predicted by the physics-based model 133 for the multiple instances of time, and residual errors between observed variables estimated by the constrained Kalman smoother for the multiple instances of time and the corresponding collected observed variables. Mathematically, the first optimization problem 139 is given by $$\theta^*, x_k^{i*} = \arg\min_{\theta, x_k^i} \sum_{i=1}^{N} \sum_{k=1}^{K} \|x_{k+1}^i - F_p(x_k^i, u_k^i, \theta)\|_{P^{-1}}^2 + \quad (5)$$

$$\|y_k^i - h(x_k^i, u_k^i, \theta)\|_{R^{-1}}^2 + \|\overline{x_0}^i - x_0^i\|_{S^{-1}}^2$$

The second optimization problem 141 is given by $$w^* = \arg\min_w \sum_{i=1}^{N} \sum_{k=1}^{K} \|\delta_{k+1}^{i*} - F_d(x_k^{i*}, u_k^i, w)\|^2 \quad (6)$$

where, $$\delta_k^{i*} := x_{k+1}^{i*} - F_p(x_k^{i*}, u_k^i, \theta^*)$$

The first optimization problem (5) 139 is solved to estimate the parameters θ* of the physics-based model 133 and the states $x_k^{i*}$ at all time instances for the observed variables collected.

Some embodiments are based on the realization that the first optimization problem (5) 139 of joint estimation of the states and the parameters of the physics-based model 133 can be interpreted as a maximum a posteriori estimation of θ and $x_k^i$, where the VCS is subject to Gaussian disturbances. Therefore, the first optimization problem (5) 139 can be efficiently solved using 4-dimensional variational (4DVar) data assimilation methods. In practice, computational costs and scalability concerns motivate use of optimal smoothing methods, such as Kalman smoother, for solving the first optimization problem (5) 139.

Kalman smoothing algorithms are non-causal data assimilation methods in which measurement data available at a future time instance is used to improve an estimate of the state in the past using a Kalman estimation framework. Therefore, Kalman smoothers are well-suited for batch processing of measurements or observed variables collected over multiple instances of time. Kalman smoothing methods are guaranteed to be optimal for solving (5) if underlying functions $F_p$ and h are linear in optimization variables. While underlying governing equations of the vapor compression cycle 100 are not linear, Kalman smoothing algorithms are still advantageous for obtaining an approximate solution to (5) due to their reasonably well accuracy, computational efficiency and simpler implementations compared to sophisticated solvers that might be otherwise needed to solve (5). Kalman smoothers for nonlinear systems can be implemented in various formulations, such as Extended Kalman Smoother and Ensemble Kalman Smoother. Extended Kalman Smoother, also known as Rauch-Tung-Striebel (RTS) smoother, linearizes nonlinear dynamics and uses Jacobian matrices for propagation and update steps of Kalman estimation process. Ensemble Kalman Smoother is Monte-Carlo type method in which an ensemble of random particles sampled from a state distribution is used for propagation phase, and empirically calculated covariance matrices are used in update steps. For a high-dimensional nonlinear system like the vapor compression cycle 100, Ensemble Kalman Smoother is used as it circumvents need to store high-dimensional covariance matrices which are needed in Extended Kalman Smoother.

Moreover, Kalman smoothers can be customized for specific vapor compression applications for substantially faster solutions that also incorporate physics-based state constraints. For example, refrigerant pressure in a heat exchanger must decrease in a direction of flow to satisfy fundamental physical relationships in the vapor compression cycle 100. If such a constraint on the refrigerant pressure is not satisfied after a state correction is applied at a given time, the solver may not be able to successfully integrate a dynamic model forward over the next time interval because perturbed pressures may cause nonphysical changes in a direction of the flow and violate fundamental assumptions of the dynamic model.

Therefore, the first optimization problem (5) 139 is solved using a constrained Kalman smoother 143 to estimate the parameters θ* of the physics-based model 133 and the states $x_k^{i*}$. In particular, the processor 127 executes the constrained Kalman smother over the observed variables collected over multiple time instances to estimate the parameters θ* of the physics-based model 133 and the states $x_k^{i*}$ by minimizing the cost function of (5).

There exists a difference between the states predicted by the physics based model 133 and the states estimated by executing the constrained Kalman smoother. Such a difference is referred to as a residual error. The residual error can be calculated as follows $$\delta_k^{i*} := x_{k+1}^{i*} - F_p(x_k^{i*}, u_k^i, \theta^*)$$

To compensate for the residual error, the parameters w of the data-driven model 135 are determined such that a cumulative learning cost function, which is comprised of a difference between the residual errors and the data-driven model 135 outputs corresponding to the same inputs that generated the error residuals at that time instants, is minimized. The residual errors $\delta_k^{i*}$ are known constants within the scope of the second optimization problem, thus, the data-driven model 135 essentially attempts to learn the residual errors for a given input state vector and control input vector.

To that end, some embodiments of the present disclosure are based on the realization that the second optimization problem (6) 141 of determining the parameters w* is a standard neural network training problem. According to an embodiment, the second optimization problem (6) 141 is solved using stochastic gradient descent 145 to determine the parameters w* of the data-driven model 135. The data-driven model 135 is trained with training data set comprising ordered tuples, $(\delta_k^{i*}, x_k^{i*}, u_k^{i})$. Input to the data-driven model 135 is $(x_k^{i*}, \delta_k^{i*})$ and output of the data-driven model 135 is the residual error $\delta_k^{i*}$.

Further, the processor 127 updates the hybrid model 131 with the parameters θ* of physics-based model 133 and the parameters w* of the data-driven model 135. In other words, the updated hybrid model 131 includes the physics-based model 133 with the parameters θ* and the data-driven model 135 with the parameters w*. Further, the processor 127 controls the operation of the vapor compression cycle 100 using the updated hybrid model 131. For instance, based on the updated hybrid model 131, the processor 127 determines the control inputs to the actuators of the vapor compression cycle 100, e.g., the speed of the compressor 101, the speed of the fan 111, the position of the expansion valve 105, and the speed of the fan 113. Further, the processor 127 controls the actuators based on the determined control inputs.

In some embodiments, the digital representation of observed variables of the operation of the vapor compression cycle 100 collected from the sensors 115, 117, 119, 121, and 123, is transmitted to a storage medium co-located at the same geographical site where the vapor compression cycle 100 is located.

Figure 2:
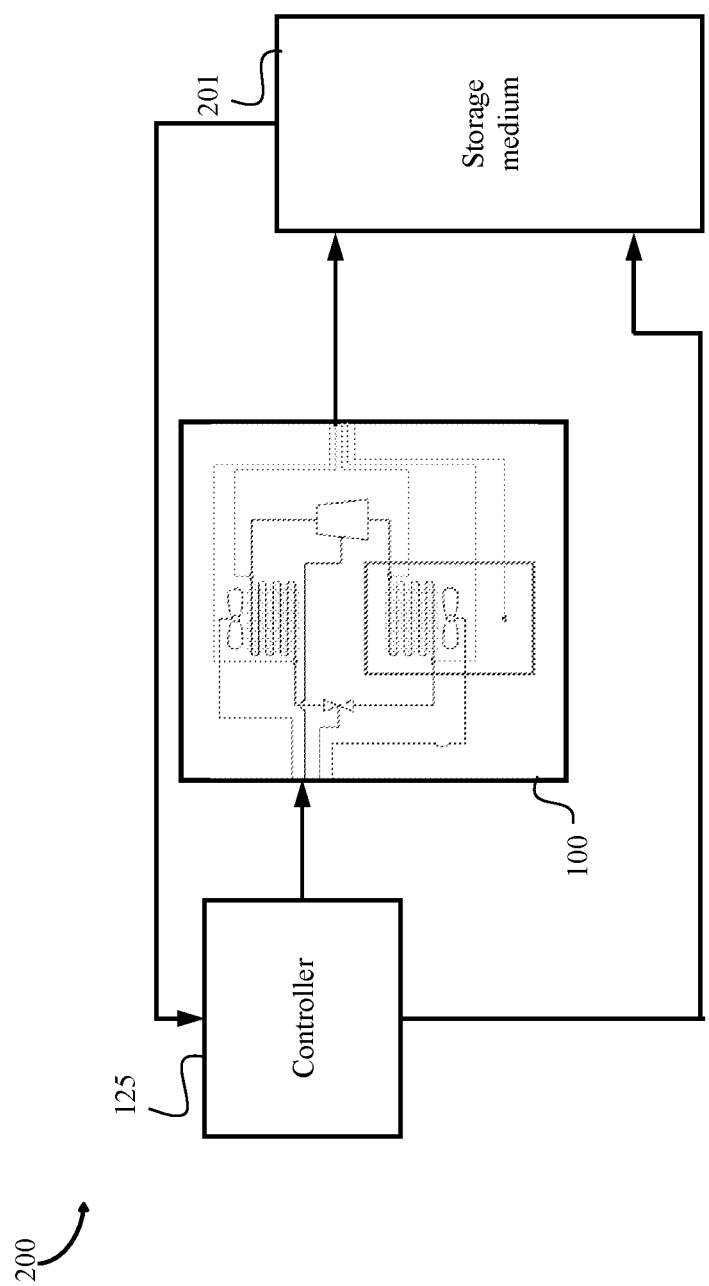
FIG. 2 shows a schematic of a system architecture including a storage medium, according to some embodiments of the present disclosure.

FIG. 2 shows a schematic of a system architecture 200 including a storage medium 201, according to some embodiments of the present disclosure. The digital representation of observed variables of the operation of the vapor compression cycle 100 collected over multiple instances of time from the sensors 115, 117, 119, 121, and 123, and control inputs provided by the controller 125 are stored in the storage medium 201. Additionally, in some embodiments, other internal information associated with the controller 125, such as internal controller variables, discrete variables from control logic, or other information produced by the controller 125, may be stored in the storage medium 201. The storage medium may be co-located at the same geographical site where the vapor compression cycle 100 is located.

Further, data from the storage medium 201 is periodically provided to the controller 125, either at regular intervals or when there is an event that calls for the updating of the hybrid model 131, for example, when a user requests for information related to the operation of the vapor compression cycle 100. In an embodiment, the data provided from the storge medium 203 may include the digital representation of observed variables of the operation of the vapor compression cycle collected over multiple instances of time.

Some embodiments are based on the realization that a part or whole of the data stored in the storage medium 201 may be stored using cloud computing resources, and, in addition, the updating of the hybrid model 131 may be implemented on a remote server. Such an embodiment is described in FIG. 3.

Figure 3:
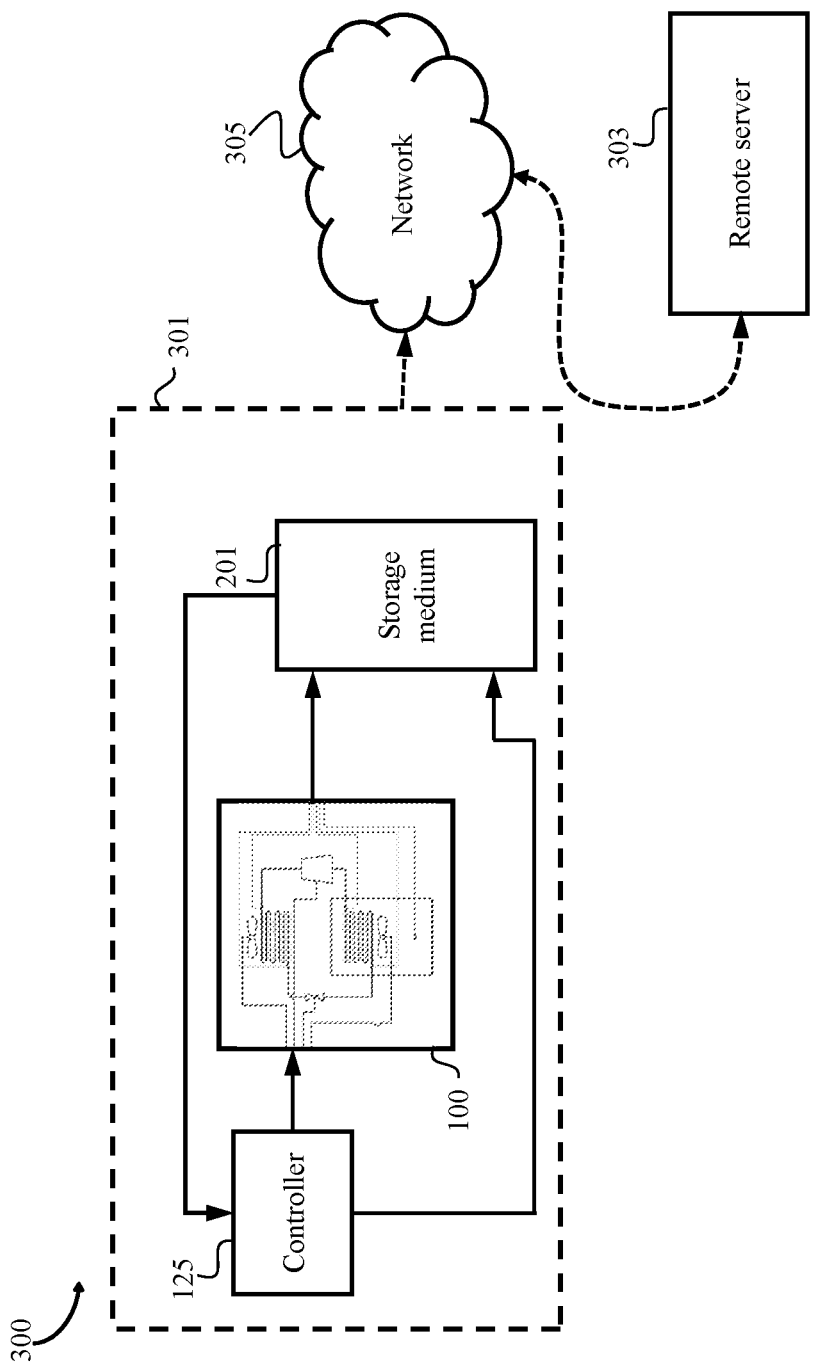
FIG. 3 shows a schematic of a cloud-based architecture, according to some embodiments of the present disclosure.

FIG. 3 shows a schematic of a cloud-based architecture 300, according to some embodiments of the present disclosure. The vapor compression cycle 100, the controller 125, and the storage medium 201 is considered to be a system 301. The system 301 is in communication with the remote server 303 (also referred to as a cloud computing system) via a network 305. In this case, a size of the storage medium 201 may vary and, additionally or alternatively, may or may not be present, depending on ability and/or reliability of the remote server 303 to access data from the vapor compression cycle 100.

The system 301 is configured to transmit a part or whole of data (e.g., the digital representation of the observed variables and control inputs) to the remote server 303 for storage, rather than maintaining the data in the storage medium 201 co-located with the vapor compression cycle 100. Further, the remote server 303 may store the model attributes of the hybrid model 131, i.e., the parameters θ of the physics-based model 133, and the parameters w of the data-driven model 135.

The model attributes of the hybrid model 131 stored in the remote server 303 may be updated at regular intervals or when an update triggering event occurs. The update triggering event includes a user requests information related to the operation of the vapor compression cycle 100, replacement of a failed component (e.g. compressor, fan) of the vapor compression cycle 100 with a new component, the user requests to update the hybrid model 131, and the like. For example, a failed component (e.g. compressor, fan) of the vapor compression cycle 100 may be replaced during maintenance service by an independent contractor. The specification information of the newly installed component can be used to update the hybrid model 131 on the remote server 303 to mimic the physical vapor compression cycle 100 as closely as possible.

For instance, when an update triggering event occurs, the remote server 303 executes the constrained Kalman smoother 143 over the observed variables collected over multiple instances of time to jointly estimate the parameters of the physics-based model 133 and the states of the vapor compression cycle 100 to minimize the cost function comprised of the residual errors of the state transitions predicted by the physics-based model 133, and the residual errors between observed variables estimated by the constrained Kalman smoother for the multiple instances of time and the corresponding collected observed variables.

Further, the remote server 303 updates the data-driven model 135 to minimize a difference between the states estimated by executing the constrained Kalman smoother 143 over the observed variables collected over multiple instances of time and the states predicted by the physics-based model 133. The remote server 303 further updates the hybrid model with the estimated parameters of the physics-based model 133 and the updated data-driven model.

The remote server 303 further transmits the updated hybrid model to the controller 125 via the network 305. The controller 125 receives the updated hybrid model and controls the operation of the vapor compression cycle using the received updated hybrid model.

The cloud-based architecture 300 is advantageous. For example, only limited computational resources are required to be co-located with the vapor compression cycle 100, and appropriate computational resources can be easily adjusted and scaled in the remote server 303, i.e., cloud. In addition, both the data and the estimates of the states of the vapor compression cycle 100 can be simultaneously used in a variety of different contexts, including but not limited to equipment service or maintenance scheduling, or use in development of next-generation systems. According to some embodiments, the estimates of the states of the vapor compression cycle 100 may indicate a need for equipment maintenance that is not readily apparent from measured data. The cloud-based architecture 300 may make such information readily and asynchronously available to service companies so that they can automatically follow-up with a user and schedule a maintenance call. In addition, the information provided to the service company enables use of precise diagnostics and service tools.

In an embodiment, the constrained Kalman smoother that is executed to estimate the parameters θ* of the physics-based model 133 and the states $x_k^{i*}$ is a constrained ensemble Kalman smoother. The constrained ensemble Kalman smoother is described below in FIG. 4.

Figure 4:
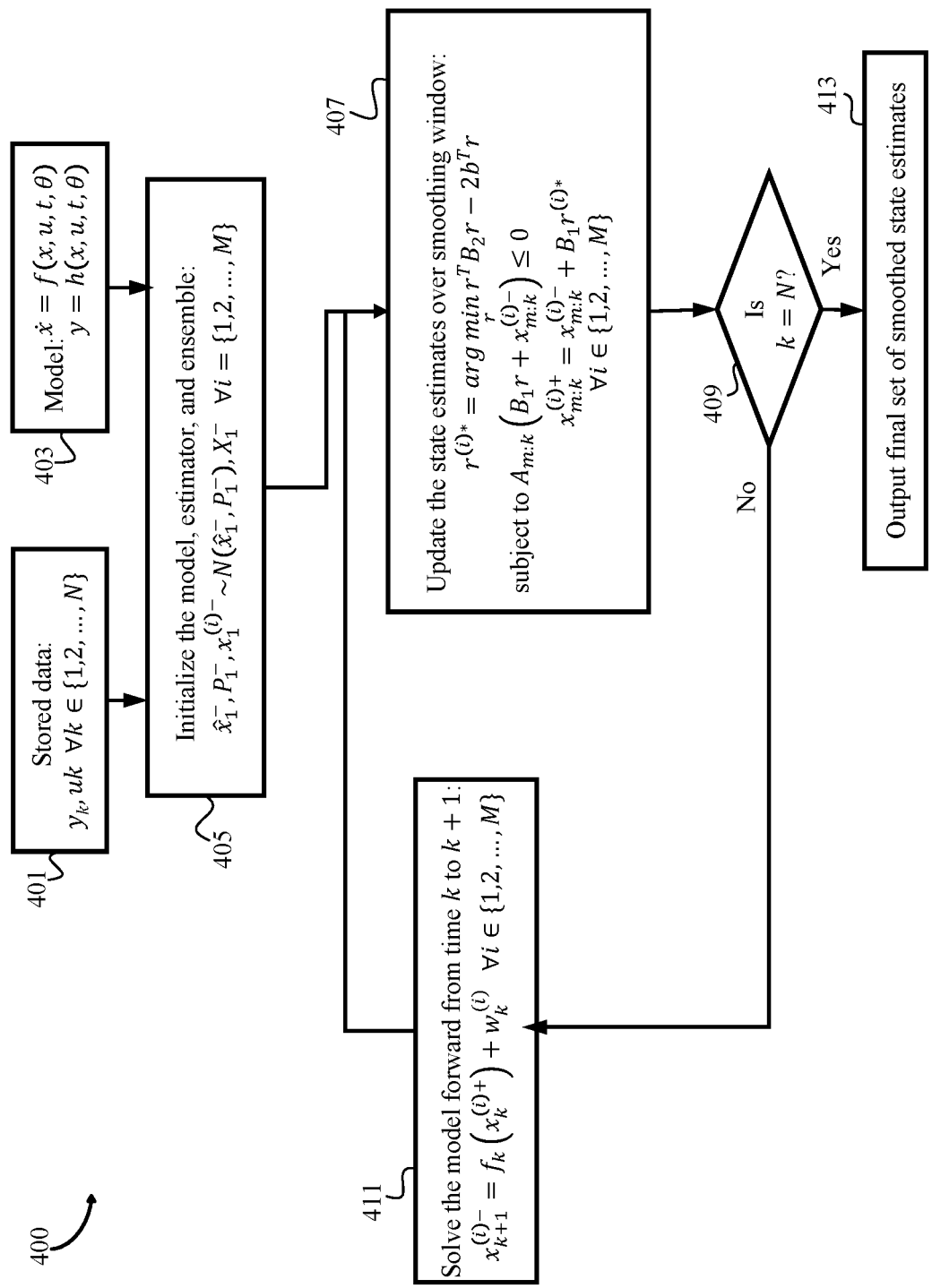
FIG. 4 shows a block diagram of a method for estimation of states using a constrained ensemble Kalman smoother, according to some embodiments of the present disclosure.

FIG. 4 shows a block diagram of a method 400 for estimation of the states using the constrained ensemble Kalman smoother, according to some embodiments of the present disclosure.

The method 400 begins with data 401 from the operation of the vapor compression cycle 100 and a model 403 of the vapor compression cycle 100. The data 401 includes a set of control inputs u and measurements, i.e. observed variables y from the sensors installed in the vapor compression cycle 100. According to an embodiment, the model 403 of the vapor compression cycle 100 describes both evolution of state variables via a function f and the measurements as a function of the state variables via a second function h which may be potentially a nonlinear function.

At block 405, the data 401 and the model 403 are used to initialize the unconstrained ensemble Kalman smoother with an initial ensemble of states $x_1^{(i)-}$ of size M. One approach for initializing the constrained ensemble Kalman smoother is to determine a consistent initialization of the model 403 given a user-specified set of initial conditions, and then perturb initial states with a stochastic set of perturbations with an estimated model covariance.

At block 407, the state variables that are transformed into a range of the covariance $r^{(i)*}$ are updated over a smoothing window for every measurement in the data 401 by solving the constrained optimization problem. The transformed corrections are then transformed back into coordinate system of original state variables to obtain corrected augmented state estimates. Although this embodiment of the constrained smoothing method 400 is not constructed for real-time use, the solution of the constrained optimization problem in block 407 for every sample at each available data point may be computationally expensive. To this end, in some embodiments, the update step in block 407 can be replaced with a two-stage process, wherein in a first stage, the update is performed without constraints. After this update is applied, in a second stage, the constrained optimization problem in block 407 is solved only if the corrected augmented state estimates obtained in the first stage violate the constraints. The second stage is skipped if the constraints are satisfied after the corrections in the first stage.

While there may be N data points available, either all N data points may be used or a smaller set may be used in the smoothing window. For example, the state updates in the coordinate system of the range of the covariance at the first measurement time k=1 are calculated while applying constraints and then transformed back into the coordinate system of the original state variables.

At block 409, it is checked if the measurement time k=1 is the time instant of the last data point if the end of the available data has been reached. Since the measurement time k=1 is not equal to N, at block 411, nonlinear model f is then solved forward from the first to the second measurement time k=2, and then the state variables are once again updated to account for the measurements at time k=2.

At time k=2, state corrections are applied to the state estimates at both times k=1 and k=2 and the constraints are enforced at both times k=1 and k=2. This ensures that the state estimates at time k=1 account for the measurements at time k=2 and that the constraints will be satisfied at both times. In such an iteration, the length of data over which the state estimates will gradually increase as additional data is incorporated until all of the N data points are incorporated, and all of the state variables will be continually updated to reflect the new information provided by the data points that are sequentially added to the growing smoothing window. Increases in the length of the smoothing window as more data points are incorporated may pose serious computational challenges such as prohibitive memory requirements and computation time.

To this end, the length of a smoothing window, i.e., number of data points l=k−m+1 in a smoothing window may be fixed to be a constant after sufficient number of data points are incorporated in the corrected state estimates in some embodiments, so that the data points available at times prior to m are not considered in the update step 407. Once each data point is processed, at block 413, a final set of smoothed state estimates is output. The final set of smoothed state estimates includes the states of the vapor compression cycle 100.

In another embodiment, the constrained ensemble Kalman smoother 400 is adapted to jointly estimate the states and the parameters of the physics-based model. Within the scope of the joint estimation, the constrained ensemble Kalman smoother 400 estimates an augmented vector which includes both the states and the parameters of the physics-based model, while following a similar general flow of the method of the constrained ensemble Kalman smoother 400.

Further, an overall method for controlling the operation of the vapor compression cycle 100 is described below in FIG. 5A.

Figure 5A:
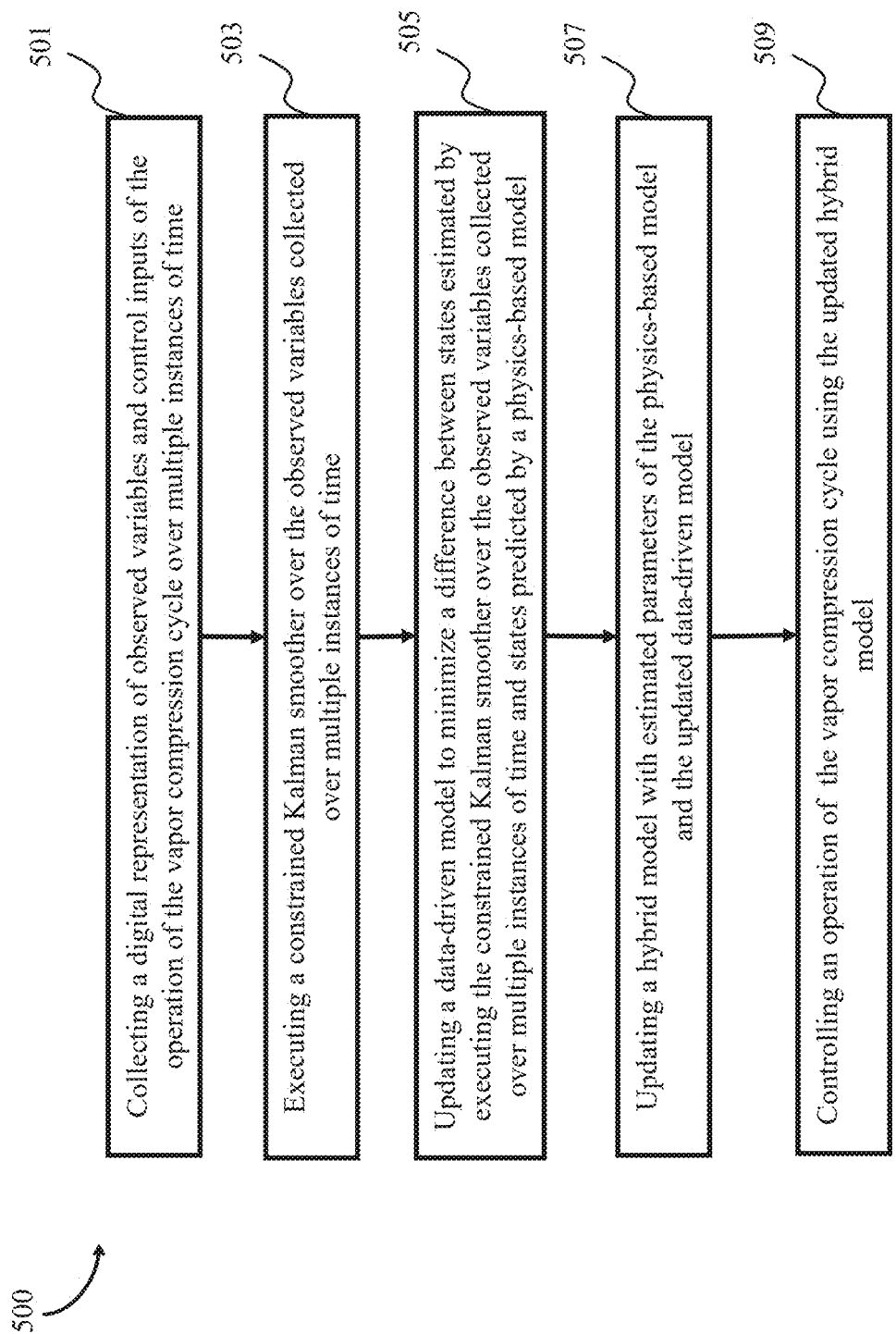
FIG. 5A shows a block diagram of a method for controlling the operation of the vapor compression cycle, according to an embodiment of the present disclosure.

FIG. 5A shows a block diagram of a method 500 for controlling the operation of the vapor compression cycle 100, according to an embodiment of the present disclosure. At block 501, the method 500 includes collecting a digital representation of observed variables and control inputs of the operation of the vapor compression cycle 100 over multiple instances of time. At block 503, the method 500 includes executing the constrained Kalman smoother 143 over the observed variables collected over multiple instances of time to jointly estimate the parameters of the physics-based model 133 and the states of the vapor compression cycle 100 to minimize the cost function comprised of the residual errors of the state transitions predicted by the physics-based model 133, and the residual errors between observed variables estimated by the constrained Kalman smoother for the multiple instances of time and the corresponding collected observed variables.

At block 505, the method 500 includes updating the data-driven model 135 to minimize a difference between the states estimated by executing the constrained Kalman smoother 143 over the observed variables collected over multiple instances of time and the states predicted by the physics-based model 133. At block 507, the method 500 includes updating the hybrid model 131 with the estimated parameters of the physics-based model 133 and the updated data-driven model. At block 509, the method 500 includes controlling the operation of the vapor compression cycle 100 using the updated hybrid model.

FIG. 5B shows a block diagram for controlling the operation of the vapor compression cycle 100 using the updated hybrid model, according to an embodiment of the present disclosure. At block 511, unobserved variables of the vapor compression cycle 100 are determined using the updated hybrid model. The unobserved variables correspond to the variables that are difficult to measure or cannot be measured directly. For example, the unobserved variables may include the amount of refrigerant in the vapor compression cycle 100, thermal energy delivered by one or more heat exchangers of the vapor compression cycle 100, and a thermodynamic quality of the refrigerant flow at an inlet or outlet of one or more heat exchangers of the vapor compression cycle 100. For instance, the unobserved variables $z_k^i$ of the vapor compression cycle 100 are determined from the parameters $\theta^*$ of the physics-based model 133 of the updated hybrid model, the states $x_k^{i*}$, and known control inputs as follows $$z_k^i = g(x_k^{i*}, u_k^i, \theta^*)$$

where $g(\cdot)$ is a known function that maps its arguments to the unobserved variables.

Further, at block 513, control inputs to the actuators of the vapor compression cycle 100 are determined based on the updated hybrid model and the unobserved variables. The control inputs may include one or more of the speed of the compressor 101, the speed of the fan 111, the position of the expansion valve 105, and the speed of the fan 113.

Furthermore, at block 515, actuators of the vapor compression cycle 100 are controlled according to the determined control inputs to control the operation of the vapor compression cycle 100.

Figure 6:
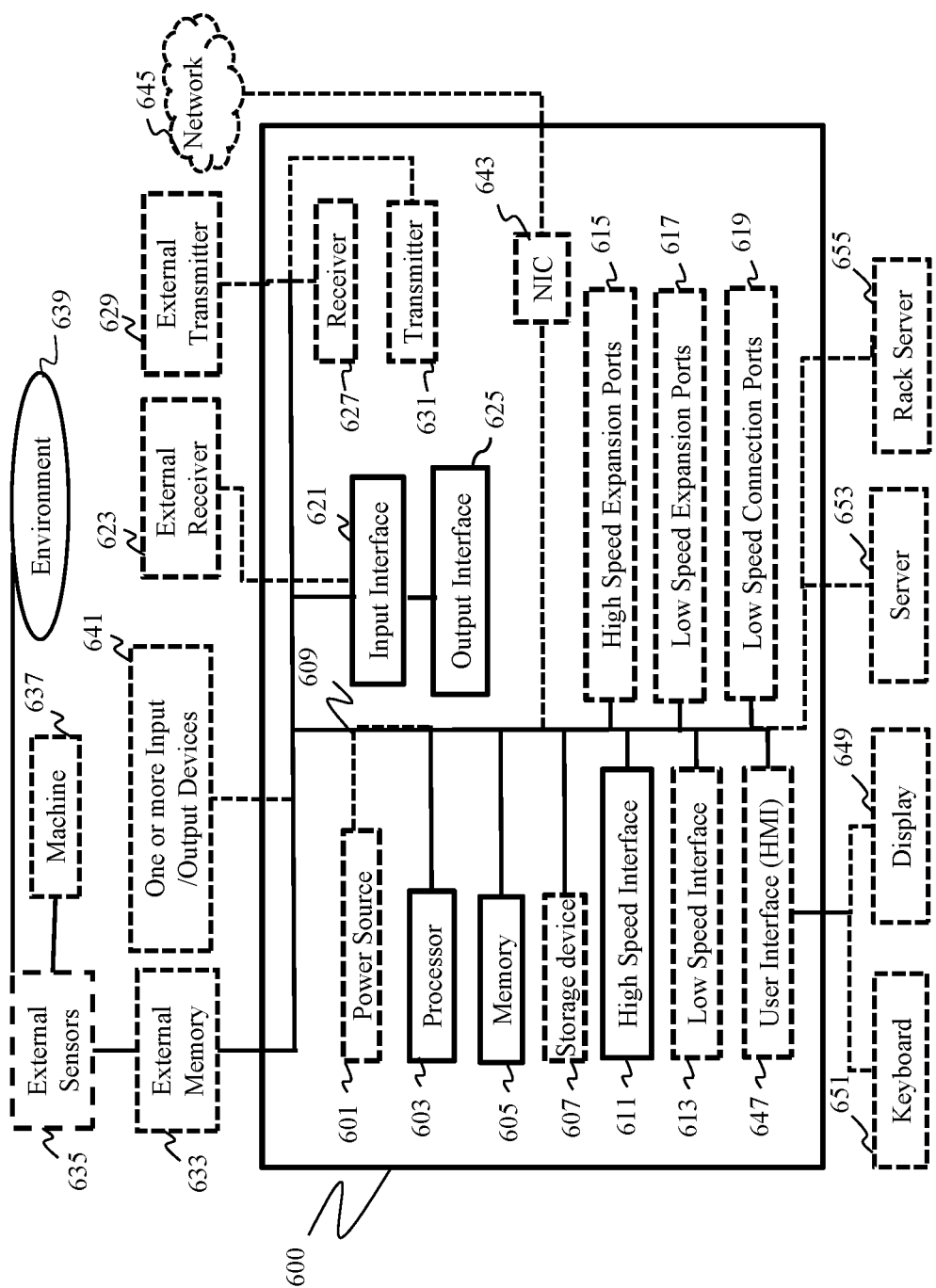
FIG. 6 shows a schematic diagram of a computing device that can be used for implementing the controller and the method of the present disclosure.

FIG. 6 shows a schematic diagram of a computing device that can be used for implementing the controller 125 and the method 500 of the present disclosure. The computing device 600 includes a power source 601, a processor 603, a memory 605, a storage device 607, all connected to a bus 609. Further, a high-speed interface 611, a low-speed interface 613, high-speed expansion ports 615 and low speed connection ports 617, can be connected to the bus 609. In addition, a low-speed expansion port 619 is in connection with the bus 609. Further, an input interface 621 can be connected via the bus 609 to an external receiver 623 and an output interface 625. A receiver 627 can be connected to an external transmitter 629 and a transmitter 631 via the bus 609. Also connected to the bus 609 can be an external memory 633, external sensors 635, machine(s) 637, and an environment 639. Further, one or more external input/output devices 641 can be connected to the bus 609. A network interface controller (NIC) 643 can be adapted to connect through the bus 609 to a network 645, wherein data or other data, among other things, can be rendered on a third-party display device, third party imaging device, and/or third-party printing device outside of the computing device 600.

The memory 605 can store instructions that are executable by the computing device 600 and any data that can be utilized by the methods and systems of the present disclosure. The memory 605 can include random access memory (RAM), read only memory (ROM), flash memory, or any other suitable memory systems. The memory 605 can be a volatile memory unit or units, and/or a non-volatile memory unit or units. The memory 605 may also be another form of computer-readable medium, such as a magnetic or optical disk.

The storage device 607 can be adapted to store supplementary data and/or software modules used by the computer device 600. The storage device 607 can include a hard drive, an optical drive, a thumb-drive, an array of drives, or any combinations thereof. Further, the storage device 607 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 603), perform one or more methods, such as those described above.

The computing device 600 can be linked through the bus 609, optionally, to a display interface or user Interface (HMI) 647 adapted to connect the computing device 600 to a display device 649 and a keyboard 651, wherein the display device 649 can include a computer monitor, camera, television, projector, or mobile device, among others. In some implementations, the computer device 600 may include a printer interface to connect to a printing device, wherein the printing device can include a liquid inkjet printer, solid ink printer, large-scale commercial printer, thermal printer, UV printer, or dye-sublimation printer, among others.

The high-speed interface 611 manages bandwidth-intensive operations for the computing device 600, while the low-speed interface 613 manages lower bandwidth-intensive operations. Such allocation of functions is an example only. In some implementations, the high-speed interface 611 can be coupled to the memory 605, the user interface (HMI) 646, and to the keyboard 651 and the display 649 (e.g., through a graphics processor or accelerator), and to the high-speed expansion ports 615, which may accept various expansion cards via the bus 609. In an implementation, the low-speed interface 613 is coupled to the storage device 607 and the low-speed expansion ports 617, via the bus 609. The low-speed expansion ports 617, which may include various communication ports (e.g., USB, Bluetooth, Ethernet, wireless Ethernet) may be coupled to the one or more input/output devices 641. The computing device 600 may be connected to a server 653 and a rack server 655. The computing device 600 may be implemented in several different forms. For example, the computing device 600 may be implemented as part of the rack server 655.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A controller for controlling an operation of a vapor compression cycle based on a hybrid model of dynamics of the vapor compression cycle including a physics-based model and a data-driven model, wherein the physics-based model is configured to predict transitions of states of the vapor compression cycle in accordance with observed variables and a control input to the vapor compression cycle based on parameters of the physics-based model, and wherein the data-driven model is trained with machine learning to estimate residual errors of the state transitions predicted by the physics-based model, the controller comprising: a processor; and a memory having instructions stored thereon that, when executed by the processor, cause the controller to:

collect a digital representation of observed variables of the operation of the vapor compression cycle over multiple instances of time;

execute a constrained Kalman smoother over the observed variables collected over multiple instances of time to jointly estimate the parameters of the physics-based model and states of the vapor compression cycle to minimize a cost function comprising residual errors of the state transitions predicted by the physics-based model for the multiple instances of time, and residual errors between observed variables estimated by the constrained Kalman smoother for the multiple instances of time and the corresponding collected observed variables;

update the data-driven model to minimize a difference between the states estimated by executing the constrained Kalman smoother over the observed variables collected over multiple instances of time and the states predicted by the physics-based model;

update the hybrid model with the estimated parameters of the physics-based model and the updated data-driven model;

determine, based on the updated hybrid model, control inputs to one or more actuators of the vapor compression cycle; and control the one or more actuators based on the control inputs to control the operation of the vapor compression cycle.

2. The controller of claim 1, wherein the physics-based model includes one or a combination of governing partial differential equations discretized over spatial and temporal domains, look up tables, and interpolation splines for calculating thermodynamic properties of a refrigerant of the vapor compression cycle.

3. The controller of claim 2, wherein the parameters of the physics-based model include a number of finite control volumes for discretization of governing partial differential equations, geometric parameters of the vapor compression cycle, properties of materials used in the vapor compression cycle, and a total mass of the refrigerant.

4. The controller of claim 1, wherein the data-driven model includes a neural network.

5. The controller of claim 4, wherein parameters of the data-driven model include architecture, weights, and biases of the neural network.

6. The controller of claim 1, wherein the observed variables include measurements of one or more of a temperature and a pressure, at different locations in the vapor compression cycle.

7. The controller of claim 1, wherein the control inputs to the one or more actuators of the vapor compression cycle includes a compressor speed, a fan speed, and a position of an expansion valve.

8. The controller of claim 1, wherein the processor is further configured to transmit the digital representation of observed variables of the operation of the vapor compression cycle to a remote server for storage.

9. A method for controlling an operation of a vapor compression cycle based on a hybrid model of dynamics of the vapor compression cycle including a physics-based model and a data-driven model, wherein the physics-based model is configured to predict transitions of states of the vapor compression cycle in accordance with observed variables and a control input to the vapor compression cycle based on parameters of the physics-based model, and wherein the data-driven model is trained with machine learning to estimate residual errors of the state transitions predicted by the physics-based model, the method comprising:

collecting a digital representation of observed variables of the operation of the vapor compression cycle over multiple instances of time;

executing a constrained Kalman smoother over the observed variables collected over multiple instances of time to jointly estimate the parameters of the physics-based model and states of the vapor compression cycle to minimize a cost function comprising residual errors of the state transitions predicted by the physics-based model for the multiple instances of time, and residual errors between observed variables estimated by the constrained Kalman smoother for the multiple instances of time and the corresponding collected observed variables;

updating the data-driven model to minimize a difference between the states estimated by executing the constrained Kalman smoother over the observed variables collected over multiple instances of time and the states predicted by the physics-based model;

updating the hybrid model with the estimated parameters of the physics-based model and the updated data-driven model;

determining, based on the updated hybrid model, control inputs to one or more actuators of the vapor compression cycle; and controlling the one or more actuators based on the control inputs to control the operation of the vapor compression cycle.

10. The method of claim 9, wherein the physics-based model includes one or a combination of governing partial differential equations discretized over spatial and temporal domains, look up tables, and interpolation splines for calculating thermodynamic properties of a refrigerant of the vapor compression cycle.

11. The method of claim 10, wherein the parameters of the physics-based model include a number of finite control volumes for discretization of governing partial differential equations, geometric parameters of the vapor compression cycle, properties of materials used in the vapor compression cycle, and a total mass of the refrigerant.

12. The method of claim 9, wherein the data-driven model includes a neural network.

13. The method of claim 12, wherein parameters of the data-driven model include one or more of architecture, weights, and biases of the neural network.

14. The method of claim 9, wherein the observed variables include measurements of one or more of a temperature and a pressure, at different locations in the vapor compression cycle.

15. The method of claim 9, wherein the control inputs to the one or more actuators of the vapor compression cycle includes a compressor speed, a fan speed, and a position of an expansion valve.

16. The method of claim 9, wherein the method further comprises transmitting the digital representation of observed variables and the control inputs of the operation of the vapor compression cycle to a remote server for storage.

17. A non-transitory computer readable storage medium embodied thereon a program executable by a processor for performing a method for controlling an operation of a vapor compression cycle based on a hybrid model of dynamics of the vapor compression cycle including a physics-based model and a data-driven model, wherein the physics-based model is configured to predict transitions of states of the vapor compression cycle in accordance with observed variables and a control input to the vapor compression cycle based on parameters of the physics-based model, and wherein the data-driven model is trained with machine learning to estimate residual errors of the state transitions predicted by the physics-based model, the method comprising:

collecting a digital representation of observed variables of the operation of the vapor compression cycle over multiple instances of time;

executing a constrained Kalman smoother over the observed variables collected over multiple instances of time to jointly estimate the parameters of the physics-based model and states of the vapor compression cycle to minimize a cost function comprising residual errors of the state transitions predicted by the physics-based model for the multiple instances of time, and residual errors between observed variables estimated by the constrained Kalman smoother for the multiple instances of time and the corresponding collected observed variables;

updating the data-driven model to minimize a difference between the states estimated by executing the constrained Kalman smoother over the observed variables collected over multiple instances of time and the states predicted by the physics-based model;

updating the hybrid model with the estimated parameters of the physics-based model and the updated data-driven model;

determining, based on the updated hybrid model, control inputs to one or more actuators of the vapor compression cycle; and controlling the one or more actuators based on the control inputs to control the operation of the vapor compression cycle.

18. A system for controlling an operation of a vapor compression cycle based on a hybrid model of dynamics of the vapor compression cycle including a physics-based model and a data-driven model, wherein the physics-based model is configured to predict transitions of states of the vapor compression cycle in accordance with observed variables and a control input to the vapor compression cycle based on parameters of the physics-based model, and wherein the data-driven model is trained with machine learning to estimate residual errors of the state transitions predicted by the physics-based model, the system comprising:

a controller that comprises a processor, and a memory having instructions stored thereon that, when executed by the processor, cause the controller to:
collect a digital representation of observed variables of the operation of the vapor compression cycle over multiple instances of time; and
transmit the digital representation of observed variables of the operation of the vapor compression cycle collected over multiple instances of time; and a remote server communicatively coupled to the controller and configured to:
receive, from the controller, the digital representation of observed variables of the operation of the vapor compression cycle collected over multiple instances of time,
execute a constrained Kalman smoother over the observed variables collected over multiple instances of time to jointly estimate the parameters of the physics-based model and states of the vapor compression cycle to minimize a cost function comprising residual errors of the state transitions predicted by the physics-based model for the multiple instances of time, and residual errors between observed variables estimated by the constrained Kalman smoother for the multiple instances of time and the corresponding collected observed variables;
update the data-driven model to minimize a difference between the states estimated by executing the constrained Kalman smoother over the observed variables collected over multiple instances of time and the states predicted by the physics-based model;
update the hybrid model with the estimated parameters of the physics-based model and the updated data-driven model; and
transmit the updated hybrid model to the controller, wherein the controller is further configured to:
determine, based on the updated hybrid model, control inputs to one or more actuators of the vapor compression cycle; and control the one or more actuators based on the control inputs to control the operation of the vapor compression cycle.

19. The system of claim 18, wherein the processor is further configured to:
determine unobserved variables of the vapor compression cycle using the received updated hybrid model.

20. The system of claim 19, wherein the processor is further configured to:
determine the control inputs to the one or more actuators of the vapor compression cycle based on the unobserved variables and the updated hybrid model; and
control the one or more actuators according to the control inputs to control the operation of the vapor compression cycle.

* * * * *